United States Patent
Gamundi

[15] 3,648,796
[45] Mar. 14, 1972

[54]
[72] Inventor: Reynold F. Gamundi, Lyndhurst, Ohio
[73] Assignee: Eaton Corporation, Cleveland, Ohio
[22] Filed: Dec. 22, 1969
[21] Appl. No.: 886,884

[52] U.S. Cl. .................................. 180/52, 180/6.2, 180/13, 180/119, 280/89
[51] Int. Cl. ........................................ B60k 1/00, B60v 1/14
[58] Field of Search .................... 180/26, 26 A, 52, 51, 13, 31

[56] References Cited

UNITED STATES PATENTS

| | | | |
|---|---|---|---|
| 1,247,073 | 11/1917 | Brown | 180/26 |
| 1,399,739 | 12/1921 | Brown | 180/26 |
| 2,820,524 | 1/1958 | Bear | 180/52 |

FOREIGN PATENTS OR APPLICATIONS

| | | | |
|---|---|---|---|
| 807,068 | 10/1936 | France | 180/26 |
| 25,828 | 10/1897 | Great Britain | 180/26 |

Primary Examiner—A. Harry Levy
Attorney—Teagno & Toddy

[57] ABSTRACT

In an air supported vehicle a steering and traction wheel is mounted for vertical movement so as to contact the floor in all vertical positions into which the vehicle is moved by the air support. The steering axis of the wheel is offset so that driving rotation of the wheel develops steering torque. A locking mechanism or clutch holds the wheel and its mounting against steering rotation until such rotation is required, and the wheel and its mounting may be locked in desired positions.

6 Claims, 6 Drawing Figures

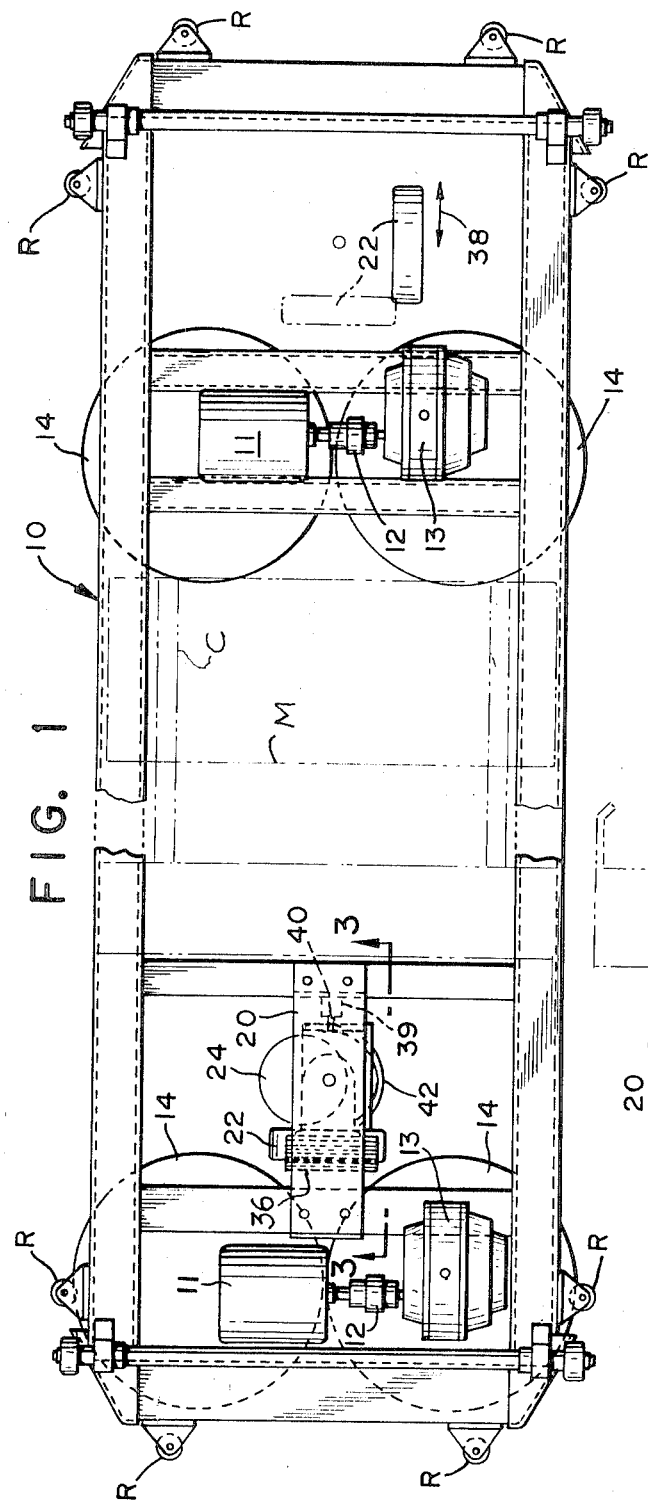
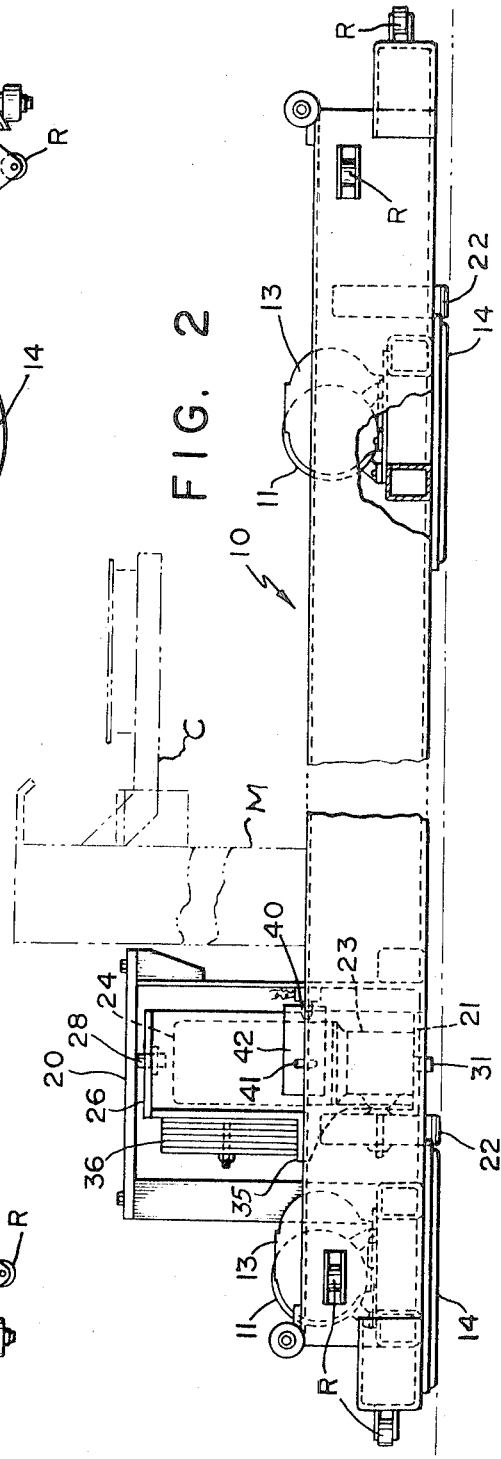

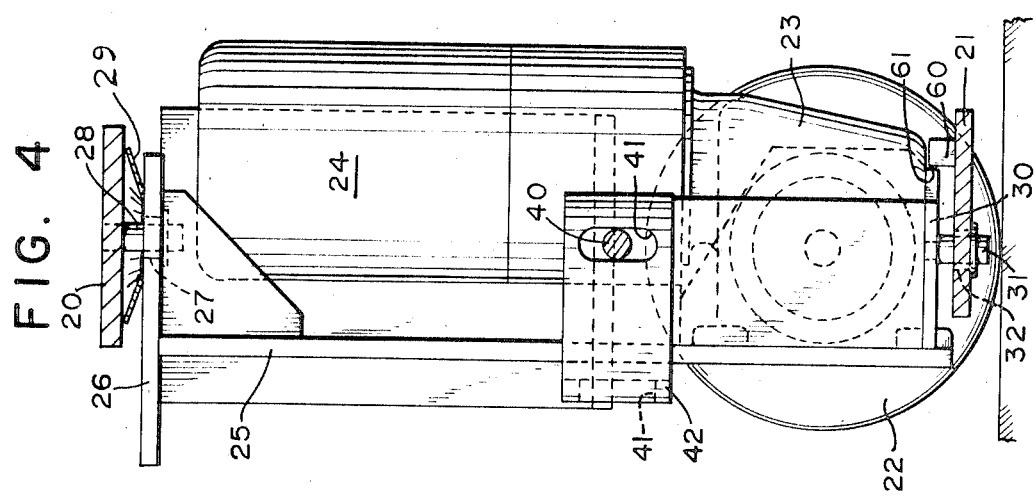
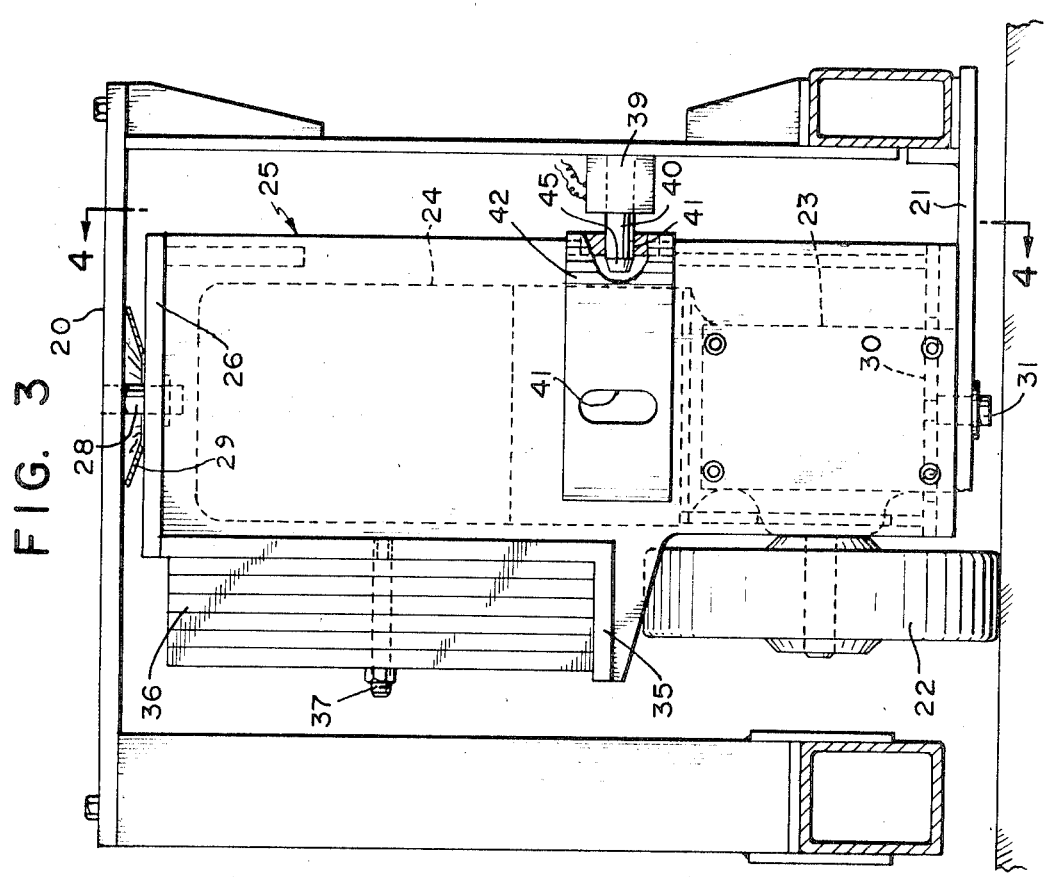

INVENTOR.
REYNOLD F. GAMUNDI

FIELD OF INVENTION

This invention relates to a steering and traction wheel adapted for use in a load handling vehicle, and particularly a load handling vehicle of the type that is supported on an air cushion to facilitate its movement.

PRIOR ART

In recent years there have been many developments in load handling vehicles of the type in which blasts of air are utilized for holding a vehicle in a slightly elevated position relatively to a floor or other surface, with relatively low powered means adapted for moving the vehicle linearly in any desired path. Such air support means are commonly referred to as ground effect machines. As a matter of fact, the vehicle may actually be moved manually, due to the fact that the air cushion created by the blasts of air eliminates the friction that is present to hinder the movement of conventional vehicles. There appears to be no pertinent prior art relating to powered traction and steering wheels for directing and moving a vehicle of the class described, due to the rather considerable difficulties that are encountered in mounting and controlling a steering and traction wheel in a vehicle of this class.

OUTLINE OF THE INVENTION

A feature of the invention of this application is the utilization of a steering and traction wheel that may be maintained in driving contact with the floor when the vehicle is elevated relatively to the floor. As a particular feature of the invention, the frictional force developed between the wheel and the floor may be readily adjusted through the utilization of weights, with the main reliance being gravity. Naturally, it is possible to use other adjustable means as springs for the particular purpose.

As a further feature of the invention, the steering and traction wheel is adapted to be moved for steering the vehicle through the torque developed by the driving rotation of the steering wheel. Thus, the steering and traction wheel is mounted for steering movement about a vertical axis that is offset relatively to the lines of frictional contact of the steering and traction wheel and the floor. Therefore, the steering and traction wheel is at all times exerting torque in a steering direction. Through utilization of locking means that may be readily released, the wheel is held against steering rotation, but when released, will rotate bodily in the steering axis until relocked.

In a modified form of the invention, two steering and traction wheels are utilized, each being mounted at one end of a member that is the equivalent of a steering axle. By separating one of the steering and traction wheels from the driving mechanism, the other wheel, when driven, will develop torque to bring about steering rotation of the steering axle.

A particular further feature of the invention, resides in the utilization of means for mounting the steering and traction wheel, or a pair of steering and traction wheels, together with the steering axle, for vertical movement bodily relatively to the vehicle, in order to permit the application of limited frictional contact between the single traction wheel or the two traction wheels and the floor. A still further particular feature resides in the utilization of novel detent means for preventing steering rotation while yet permitting vertical movement of the steering and traction assembly.

DESCRIPTION OF THE DRAWINGS

FIG. 1 is a plan view of a vehicle of the class referred to, showing the invention applied thereto.

FIG. 2 is a partial elevation of the vehicle illustrated in FIG. 1.

FIG. 3 is a vertical enlarged partial view taken along line 3—3 of FIG. 1.

FIG. 4 is a vertical view taken along line 4—4 of FIG. 3.

DESCRIPTION OF A PREFERRED FORM OF THE INVENTION

Figure 5:
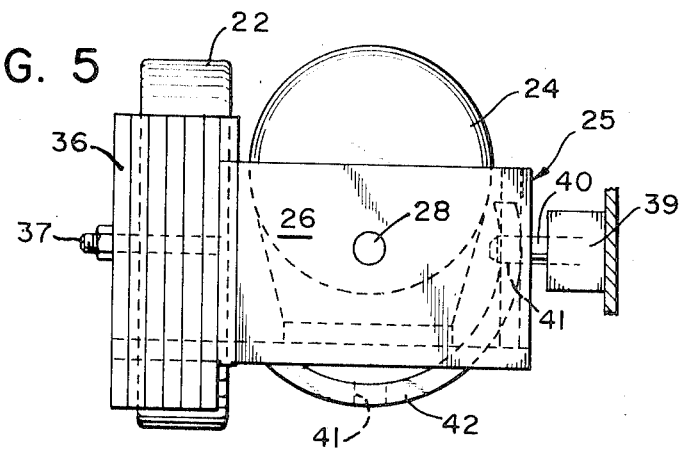
FIG. 5 is a plan view of part of FIG. 2 shown enlarged.

Referring now to FIGS. 1 and 2, reference numeral 10 indicates generally a vehicle of the class to which the invention is applied. At each end of the vehicle there is mounted an electric motor 11 adapted through a coupling 12 to actuate a blower 13, each blower being adapted through conventional means to direct air to an air cell support 14 at each side of the vehicle. Thus, there will be four of the air cell supports which, in a conventional manner, will be adapted to hold the vehicle spaced from the floor, so that it may easily be moved by the application of manual force, or by the steering and traction means of this invention.

It will be noted that at each corner of the vehicle there are rollers designated together by reference letter "R," that may be utilized for guiding the vehicle in particular paths. Thus, in many installations, a vehicle of the particular class may move in predetermined paths, as in aisles maintained at right angles to one another, with the vehicle guided by the rollers in one aisle or the other. This will all be understood by those skilled in the art.

It will be noted by reference to FIGS. 1 and 2, that at one end of the vehicle, a series of vertical and horizontal structural members support in a horizontal position, an upper bearing plate 20 that is also well shown in FIGS. 3 and 4. Suitably secured also to the main frame of the vehicle is a horizontally extending lower bearing plate 21 also best illustrated in FIGS. 3 and 4. The two plates 20 and 21 are adapted to mount for rotation, the steering and traction wheel of the vehicle, together with its mounting mechanism, this mounting mechanism constituting the equivalent of a steering axle. In FIGS. 3 and 4, the single steering and traction wheel is designated by reference numeral 22, and it may be of a conventional type driven by suitable gearing contained in a gear case 23, the gears in the gear case 23 being driven by a suitable electric motor 24. Shown in phantoms in FIGS. 1 and 2 is a mast M and a conventional lifting carriage C. The vehicle may utilize a conventional carriage and mast or may have other load handling means.

Steering the traction units per se of the particular class illustrated here, are well known in the industrial truck art. In this invention, the gear case 23 and the motor 24 are suitably mounted for integral bodily movement with a bracket assembly 25 that is fabricated through the welding together of a series of plates and angle pieces as shown in the drawings. The uppermost plate of the bracket assembly is designated by reference numeral 26, and it is formed with an opening 27 (FIG. 4) for cooperation with a stud shaft 28 extending downwardly from the bearing plate 20 of the main frame. The lowermost plate of the bracket assembly 25 is designated by reference numeral 30, and it has fixed thereto a downwardly extending bearing shaft 31 adapted to fit in a bearing opening 32 in the bottom bearing plate 21 extending from the main frame as also best seen in FIG. 4. The bearing stud shafts 28 and 31 are in vertical alignment, and define the steering axis of the entire steering and traction unit and the bracket assembly 25 relatively to the vehicle. It is obvious also, that the bracket 25 together with the steering and traction wheel 22, are free to move vertically through shafts 28, 31 in the steering axis to compensate for irregularities in the floor, and also for variations in the lifting effort exerted by the air cell supports 14.

The frictional force exerted between the wheel 22 and the floor may be varied through the utilization of particular means for pressing the bracket assembly 25 downwardly in the steering axis against the floor. A feature of the invention resides in the use of a series of weights for this purpose. Thus, the bracket assembly 25 has a horizontally extending shelf 35 on which may be rested any number of plates 36 held in position by a suitable bolt 37 that extends from the bracket assembly 25 as well seen in FIG. 3. Springs 29, hydraulic cylinders (not shown) or other means acting between the vehicle main frame and the traction steering unit may, of course, also be used to regulate the tractive effort.

It will be noted that the steering and traction wheel 22 lies in an offset position relatively to the steering axis formed by the two stud shafts 28 and 31. Therefore, driving rotation of the wheel 22, will at all times develop torque tending to rotate the steering bracket 25 in the steering axis. Thus, should the steering and traction wheel 22 be in the position shown in full lines at the right side of FIG. 1, with the vehicle moving along the line of the arrow 38, torque will be exerted by the wheel 22 tending to rotate it and bracket 25 into the dash and dotted line position of the wheel 22 also illustrated in FIG. 1. Actually only one steering and traction assembly is generally required if properly positioned on the vehicle. The showing of a second unit at the right side in FIG. 1 is made for the purpose of clarifying the operation of the particular means. If two traction and steering assemblies are spaced along the longitudinal axis of the vehicle, the assemblies should be mounted so that the horizontal driving forces therefrom are cancelled about the longitudinal axis of the vehicle. This eliminates any unbalanced couples which would exert a drift force on the vehicle during movement thereof. Movement of the bracket assembly 25 as just outlined, will ordinarily be prevented by the utilization of a suitable detent latch 40, best illustrated in FIGS. 1 and 3, mounted for movement in a housing 39 that is secured to form an integral part of the main frame of the vehicle. The detent 40 need be nothing more than a horizontally sliding pin adapted for coaction with two or more vertical slots 41 formed in a curved plate 42 secured as an integral part of the bracket assembly 25. Obviously, when the detent pin 40 is within one of the slots 41 of the curved plate 42, the plate 42 together with the bracket assembly 25 will not rotate in the steering axis, and the wheel 22 will move the vehicle in a particular line. When the detent pin 40 is moved out of the vertical slot 41, the torque exerted by the driving wheel 22 will rotate the bracket 25 in the steering axis to bring about steering movement of the bracket 25 and the entire steering and traction unit. Generally speaking, it will be desired to rotate the steering and traction unit 90° in order that the vehicle may move linearly in directions at right angles to one another. However, it is possible to bring about steering movement at other angles merely through the utilization of several of the vertical slots 41. Infinite angular variations are possible using known friction clutches or brakes.

It will be noted further, that each of the slots 41 is of such length, that even though the bracket assembly 25 cannot rotate in the steering axis, it is still free to move vertically bodily relatively to the detent pin 40 in the steering axis as determined by the stud shafts 28 and 31. This will allow adjustment for irregularities in the floor as well as contact of wheel 22 with the floor when the vehicle is raised from the floor by the air cell supports 14. Incidentally, the vehicle will generally be allowed to rest on the floor by stopping the air flow at the cell supports when it is desired to use the traction wheel torque to move the steering assembly in the steering axis. The bracket assembly 25 will naturally adjust its position by riding up and down in the steering axis.

In order to position the steering and traction bracket assembly 25 accurately, the detent pin 40 may be tapered as illustrated at 45 in FIG. 3. The actual projection and retraction of pin 40 in housing 39 is preferably accomplished by an electromagnet, air or hydraulic controls, but manual operation is quite simple as is readily seen.

Figure 6:
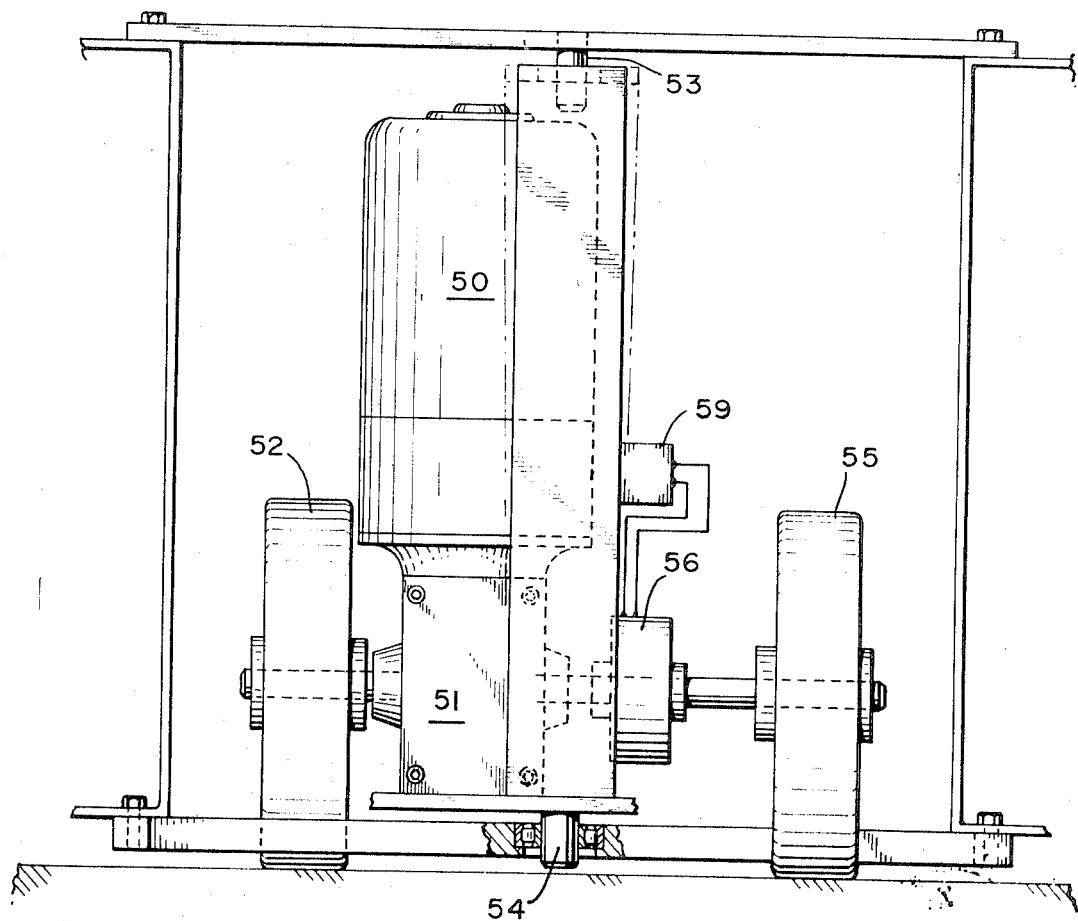
FIG. 6 is a vertical view similar to FIG. 3 but showing a modification of the invention.

Referring now to FIG. 6, a modification of the invention is illustrated. In this modification, an electric traction motor 50, through suitable gear mechanism maintained in a casing 51, drives a traction wheel 52 at one side of the steering axis, the steering axis being determined by upper stud shaft 53 and a lower stud shaft 54. A second steering and traction wheel 55 is positioned in offset position at the other side of the steering axis 53–54 in exactly the same relation to that axis as is the wheel 52. However, the wheel 55 is driven by the gearing in casing 51 through a clutch 56, this clutch being of an electric type readily controlled for making and breaking the drive connection for the wheel 55. A detent means such as 39, 40 found in the first modification is also used but is not shown. Obviously, by releasing the wheel 55 from driving engagement with the gearing in casing 51, the driving rotation of the wheel 52 will bring about steering rotation of the entire traction assembly in axis 53–54 in the same manner as in the first modification. This is accomplished by controls in box 59 which release the detent pin 40 and clutch 56 when steering is desired.

It may be well to indicate that in each of the two modifications, the bearing between the steering and traction assembly at either the upper or the lower end may be loose in a lateral direction to permit some lateral adjustment of the steering and traction wheel or wheels. Thus, in the second modification the loose connection is at the stud shaft 53, while in the first modification it is at the lower stud shaft 31 as seen in FIG. 4.

While not necessary, it is possible to utilize a stop mechanism at each end of the travel of the steering and traction assembly unit when it is desired to limit the rotation of the steering and traction assembly to 90°. Thus, as seen in FIG. 4 a stop 60 may be welded to the plate 21 for coaction with a stop surface 61 integral with the bracket assembly 25, all as those skilled in the art will appreciate. Naturally, there may be an opposed stop surface for coaction with stop 60 to control reverse rotation of the steering and traction unit.

It is thought that the extremely simple means utilized for steering the vehicle and maintaining tractive effort in all vertical positions developed by the air cells 14, will now be clearly understood and appreciated.

I claim:

1. In a load handling machine of the class described, a main frame means, a power driven wheel, mounting means for mounting said wheel relatively to said main frame means with its outer periphery in frictional contact with a surface relatively to which said power driven wheel moves said main frame means, means supporting said mounting means for steering rotation relatively to said main frame means in a vertical axis parallel and offset relatively to vertical lines passing through the points of contact of said wheel and the surface traversed thereby, said supporting means including means permitting vertical movement of said mounting means relative to said main frame means, means for locking said mounting means against steering rotation relatively to said main frame means by the torque developed through powered rotation of said wheel, means for releasing said locking means when said wheel is power driven to permit steering rotation of said mounting means by said wheel relatively to said main frame means, and weights supported by said mounting means to press said traction wheel against the surface traversed thereby.

2. In the combination of claim 1, wherein said vertical movement is effective in said vertical axis.

3. In the combination of claim 1, wherein said means supporting said mounting means for steering rotation relative to said main frame means includes upper and lower pivot shafts on one said mounting means for steering rotation and said frames means, and means on the other of said mounting means for steering rotation and said frame means supporting said upper and lower shafts for said steering rotation and said vertical movement of said mounting means relative to said main frame means.

4. In the combination of claim 1, the feature that said locking and release means comprise detent means and as said detent means is formed to allow vertical movement of said mounting means while holding said mounting means against steering rotation.

5. In the combination of claim 2, the feature that said detent means comprises a pin moving in a vertical slot.

6. In the combination of claim 1, the feature that there is a second power driven wheel; clutch means, which, when actuated, engages second wheel to be driven simultaneously with the first-mentioned mentioned driven wheel; means to actuate said clutch means; and means included in said means for releasing said locking means and communicating with said clutch actuating means for simultaneously deenergizing said actuating means and releasing said locking means whereupon driving rotation of said first-mentioned wheel alone, will rotate said mounting means in said steering axis.

* * * * *

UNITED STATES PATENT OFFICE
CERTIFICATE OF CORRECTION

Patent No. 3,648,796       Dated March 14, 1972

Inventor(s) Reynold F. Gamundi

It is certified that error appears in the above-identified patent and that said Letters Patent are hereby corrected as shown below:

Title of Patent not printed on issued patent (54).

-- STERRING AND TRACTION ASSEMBLY --.

Signed and sealed this 29th day of August 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,648,796     Dated March 14, 1972

Inventor(s) Reynold F. Gamundi

It is certified that error appears in the above-identified patent and that said Letters Patent are hereby corrected as shown below:

Title of Patent should read

-- STEERING AND TRACTION ASSEMBLY --.

This certificate supersedes Certificate of Correction Issued August 29, 1972.

Signed and sealed this 28th day of November 1972.

(SEAL)
Attest:

EDWARD M. FLETCHER, JR.
Attesting Officer

ROBERT GOTTSCHALK
Commissioner of Patents